Jan. 15, 1952   HENRI-GEORGES DOLL   2,582,314
ELECTROMAGNETIC WELL LOGGING SYSTEM
Filed June 15, 1949   7 Sheets-Sheet 1
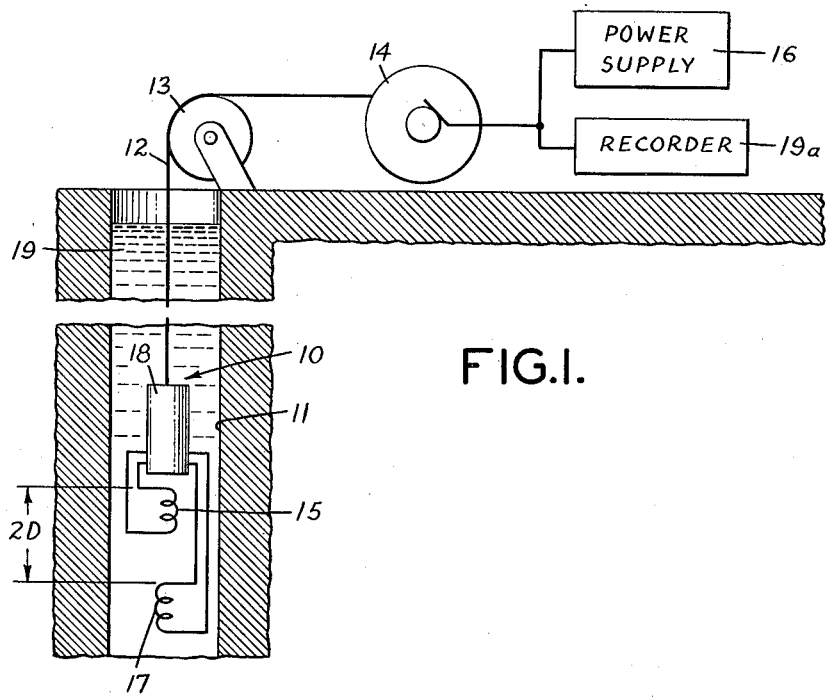
FIG.1.
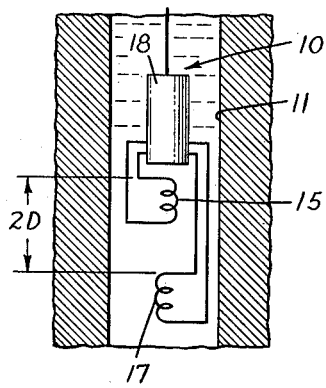
FIG.2.
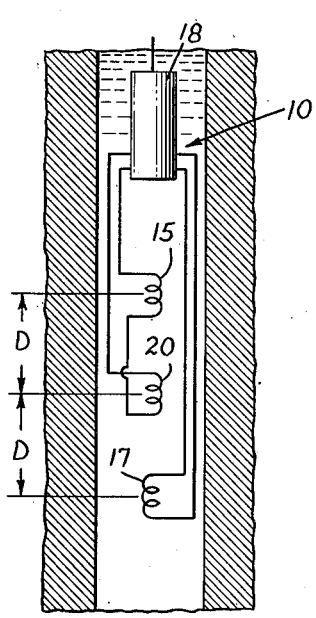
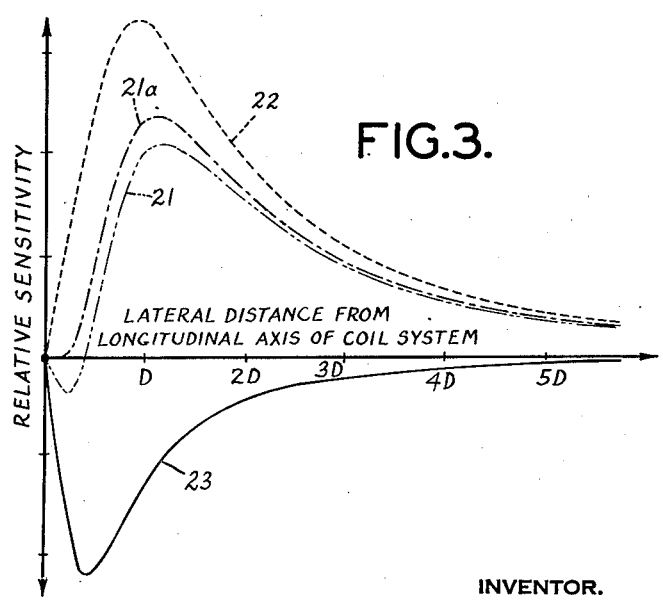
FIG.3.
INVENTOR.
HENRI-GEORGES DOLL
BY
HIS ATTORNEYS.

RELATIVE SENSITIVITY

LATERAL DISTANCE FROM LONGITUDINAL AXIS OF COIL SYSTEM

RELATIVE SENSITIVITY

LATERAL DISTANCE FROM LONGITUDINAL AXIS OF COIL SYSTEM

INVENTOR.
HENRI-GEORGES DOLL
BY
HIS ATTORNEYS.

Jan. 15, 1952 HENRI-GEORGES DOLL 2,582,314
ELECTROMAGNETIC WELL LOGGING SYSTEM
Filed June 15, 1949 7 Sheets-Sheet 3

INVENTOR.
HENRI-GEORGES DOLL
BY
Campbell, Brumbaugh, Free & Graves
HIS ATTORNEYS.

Jan. 15, 1952  HENRI-GEORGES DOLL  2,582,314
ELECTROMAGNETIC WELL LOGGING SYSTEM
Filed June 15, 1949  7 Sheets-Sheet 4

INVENTOR.
HENRI-GEORGES DOLL
BY
Campbell, Brumbaugh, Free & Graves
HIS ATTORNEYS.

Jan. 15, 1952     HENRI-GEORGES DOLL     2,582,314
ELECTROMAGNETIC WELL LOGGING SYSTEM
Filed June 15, 1949     7 Sheets-Sheet 5

INVENTOR.
HENRI-GEORGES DOLL
BY
HIS ATTORNEYS.

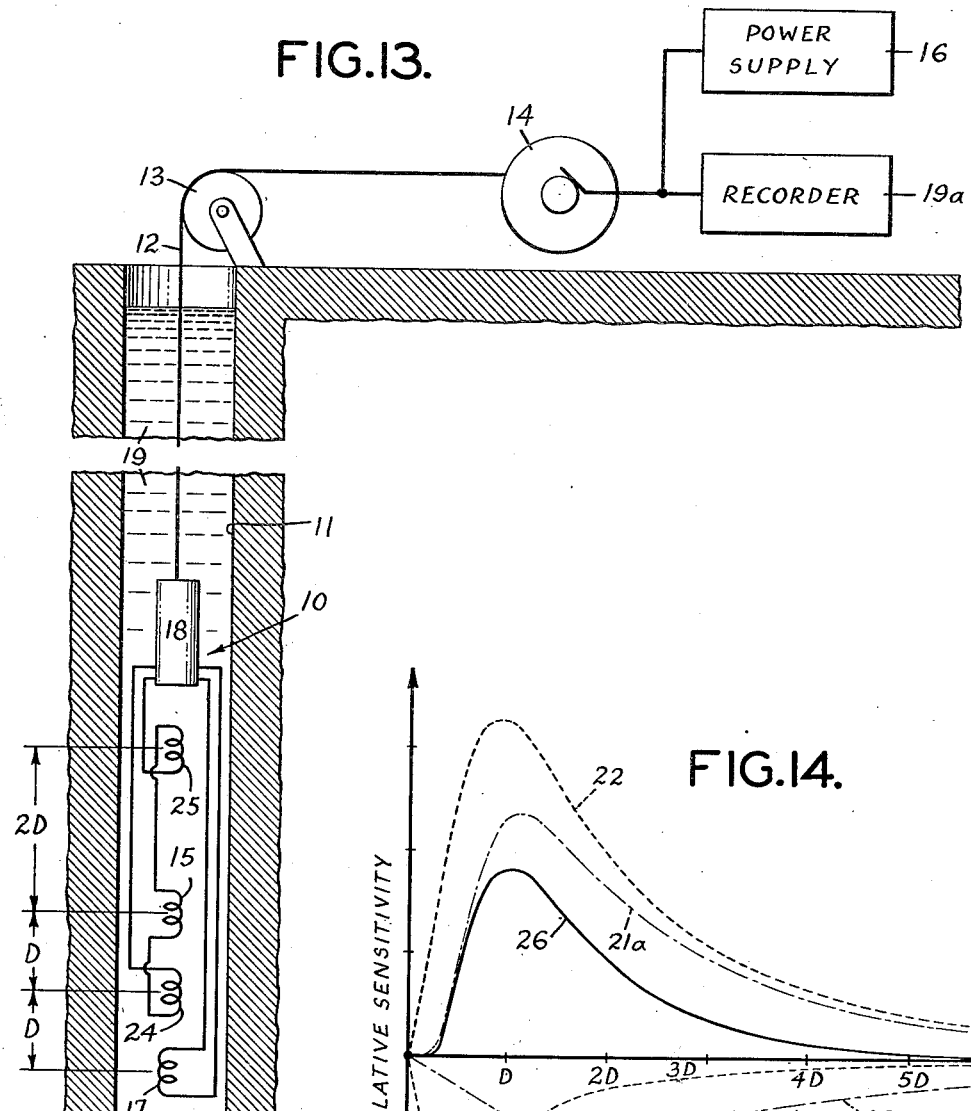

Jan. 15, 1952     HENRI-GEORGES DOLL     2,582,314
ELECTROMAGNETIC WELL LOGGING SYSTEM
Filed June 15, 1949     7 Sheets-Sheet 7

INVENTOR.
HENRI-GEORGES DOLL
BY
HIS ATTORNEYS.

Patented Jan. 15, 1952

2,582,314

UNITED STATES PATENT OFFICE 2,582,314

ELECTROMAGNETIC WELL LOGGING SYSTEM

Henri-Georges Doll, Ridgefield, Conn., assignor to Schlumberger Well Surveying Corporation, Houston, Tex., a corporation of Delaware Application June 15, 1949, Serial No. 99,300

41 Claims. (Cl. 175—182)

The present invention relates to methods and apparatus for investigating earth formations traversed by a bore hole and more particularly to electromagnetic well logging systems.

In addition to the "electrical logging" methods typified by United States Patents Nos. 1,819,923 and 1,913,293 to Conrad Schlumberger, it has been proposed, heretofore, to log bore holes electromagnetically, a procedure commonly termed "induction logging." Representative systems of the latter type are disclosed in Patents Nos. 2,220,070 to Charles B. Aiken and 2,220,788 to Ralph W. Lohman. Broadly speaking, in induction logging, a transmitter coil energized by alternating current is lowered into a bore hole and indications are obtained of the influence of surrounding formations on the electromagnetic field established by the coil. Usually such indications are obtained by observing the voltage induced in a receiver coil lowered into the bore hole in coaxial relationship with the transmitter coil and longitudinally spaced apart therefrom, the transmitter and receiver coils constituting a "two-coil" system.

While two-coil induction logging systems of this type are effective, their utility is limited in some cases by the fact that they respond not only to the formations surrounding a well, but also to any column of conducting liquid that may be present in the well. While the bore hole diameter is usually constant, enlargement may occur, particularly in the vicinity of friable formations, for example, so that the lateral distance to the boundary between the bore hole liquid and the wall of the bore hole may vary as a function of bore hole depth. The contribution made to the total response of the coil system by the bore hole liquid in such cases, therefore, may vary with bore hole depth and thus may introduce errors in the logs obtained.

Moreover, the major portion of the response of a conventional two-coil induction logging system is produced by material lying in a relatively wide zone located at a lateral distance from the axis of the system, which distance depends upon the longitudinal spacing between the coils. Such systems, therefore, are not well suited for operations in which it is desired to obtain information about material lying in a relatively narrow zone located at a selected lateral distance from the axis of the bore hole.

The principal object of the invention, accordingly, is to provide a new and improved induction logging method and apparatus whereby logs of greatly improved accuracy and reliability can be obtained.

Another object of the invention is to provide a new and improved induction logging method and apparatus in which the response from material lying in a zone situated between two laterally spaced apart locations lying on a radial line from the axis of the bore hole may be diminished.

Another object of the invention is to provide a new and improved induction logging method and apparatus of the above character in which the influence on induction logging measurements of any bore hole fluid or of enlargements of the bore hole section is minimized.

A further object of the invention is to provide new and improved induction logging systems that have reduced sensitivity to materials located at relatively great lateral distances from a bore hole.

Another object of the invention is to provide new and improved induction logging systems in which the width of the lateral zone to which the major portion of the response is attributable is narrowed whereby more localized determinations may be made.

Still another object of the invention is to provide new and improved induction logging systems which are focussed to respond predominantly to material lying in a relatively thin layer traversed by a bore hole.

A still further object of the invention is to provide new and improved induction logging systems of the above character which have reduced sensitivity to materials lying in a zone immediately surrounding the logging apparatus and, at the same time, a sharper and more clearly defined response to thin beds.

The foregoing and other objects of the invention are attained by providing multiple coil systems comprising a plurality of two-coil systems of different sensitivity characteristics, the responses of which are combined in such fashion as to produce a desired sensitivity characteristic. For example, where reduced lateral sensitivity is desired in a zone between two laterally spaced apart locations lying along a radial line from the axis of the hole, this may be accomplished by combining two or more two-coil systems in opposition, at least one of the two being suitably designed to reduce the sensitivity of the over-all combination in the desired zone without adversely affecting the sensitivity characteristic at lateral distances outside of said zone. More specifically, the zone of reduced sensitivity may be that containing the bore hole liquid, which may extend from the axis of the bore hole to the largest radius of any enlargement thereof, or any portion thereof. Such zone might also include part or all of the invaded portion of the surrounding formations.

Reduced lateral sensitivity to materials located beyond a predetermined lateral distance from the bore hole axis may be achieved in a similar manner, either alone or together with reduced lateral sensitivity to materials located relatively near the bore hole.

The invention also contemplates the provision of multiple coil systems having longitudinal sensitivity characteristics which may be modified in a similar manner by suitably combining two or more two-coil systems. In particular, the sensitivity characteristics for the respective two-coil systems may be suitably chosen so as to provide an over-all system having reduced sensitivity to materials located in the vicinity of the upper and lower extremities of the coil system. Multiple coil systems designed in this manner enable relatively thin formations, i. e. formations whose thickness is of the order of a few times the diameter of the bore hole, to be more clearly delineated.

Additional objects and advantages of the invention will be apparent from the following detailed description, taken in conjunction with the accompanying drawings, in which:

Fig. 1 illustrates schematically a conventional two-coil induction logging system;

Fig. 2 is a schematic diagram of a three-coil induction logging system constructed according to the invention;

Fig. 3 is a graph illustrating typical lateral sensitivity curves for the several two-coil combinations in the system shown in Fig. 2 as well as for the over-all system;

Fig. 13 is a schematic diagram of a coil system having a narrowed zone of lateral response;

Fig. 14 is a graph of typical lateral sensitivity curves for the several two-coil combinations of the coil system shown in Fig. 13 and for the over-all system.

Figure 4:
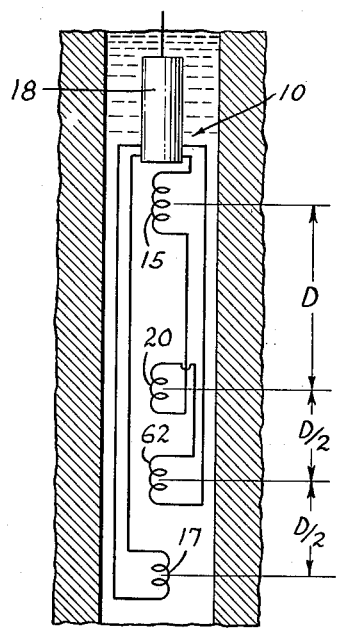
Fig. 4 illustrates a representative asymmetrical four-coil system designed according to the invention.

Of the figures described briefly above, Figs. 1–12 relate to coil systems that are characterized by reduced lateral sensitivity to materials relatively near the apparatus; Figs. 13 and 14 have to do with coil systems having reduced lateral sensitivity to materials relatively far away from the apparatus, including systems having a narrowed lateral zone of investigation; and Figs. 15–20, inclusive, are primarily concerned with longitudinal focussing systems for obtaining accurate logs of relatively thin formations, some of which also have reduced lateral sensitivity. For convenience, these three categories will be considered separately herein in the order given.

*Coil systems having reduced lateral sensitivity to relatively near materials*

A conventional induction logging system is shown in Fig. 1. It comprises induction logging apparatus 10 suspended in a bore hole 11 on a cable 12 extending to the surface of the earth. The bore hole 11 may contain a liquid 19 which may be more or less conductive than the surrounding earth, although in some cases no liquid may be present. The cable 12 passes over a pulley 13 to a suitable winch 14 by means of which it may be raised and lowered in the bore hole 11.

The logging apparatus 10 may comprise, for example, a transmitter coil 15 supplied with alternating current from a suitable oscillator in a cartridge 18 energized by a power supply 16 through conductors (not shown) in the cable 12, and a receiver coil 17 which is connected to suitable electronic equipment in the cartridge 18. The electronic circuits in the cartridge 18 may be of the type disclosed in copending application Serial No. 750,307 for "Phase Rejection Networks," filed May 24, 1947, by the present applicant, and they are preferably designed to select the rectified resistive component of the signal induced in the receiver coil 17.

The resistive signal component output of the cartridge 18 is transmitted through conductors (not shown) in the cable 12 to conventional recording means 18a, which preferably makes an automatic record which is a function of the resistive component of the voltage induced in the receiver coil 17 as the apparatus 10 is moved through the bore hole 11.

The lateral sensitivity of a conventional two-coil system as shown in Fig. 1 is given by the curve 22 in Fig. 3. The lateral sensitivity of the system at any lateral distance from its longitudinal axis is defined as the resistive component of the response of the system to a concentrically situated long cylindrical shell of unit thickness and unit conductivity, whose radius is equal to the said lateral distance. The relative responses obtained for cylindrical shells of different radii in a homogeneous medium, all other factors being kept constant, determine the sensitivity of the system at different lateral distances from its longitudinal axis. The total response of the system, therefore, is proportional to the area under the curve 22.

Of course, if the medium is not homogeneous, but is composed of adjacent cylindrical shells of different conductivities, for example, the contribution made by each shell to the total response of the system will be proportional to the conductivity of the shell and to its thickness, as well as to the sensitivity of the system at the shell radius.

Further details of a method for determining the response of a conventional two-coil induction logging system are given in a paper entitled "Introduction to Induction Logging and Application to Logging of Wells Drilled with Oil Base Mud," which was presented by the applicant at the Annual Meeting of the American Institute of Mining and Metallurgical Engineers, San Francisco, California, February 13–17, 1949.

Referring to Fig. 3, the abscissae for the curve 22 are lateral distances from the longitudinal axis of the coil system corresponding to the different radii assumed for the cylindrical shell, measured in terms of the half separation distance D between the coils 15 and 17, while the ordinates are the relative sensitivity values of the receiver coil 17 for the respective shell radii. It will be noted that the curve 22 rises sharply from the origin to a peak sensitivity value at a lateral distance of about .9D then falls off more slowly and becomes asymptotic to the abscissae axis. It will be understood, therefore, that if a two-coil system of the type shown in Fig. 1 is suspended in a bore hole containing a column of conducting liquid, a portion of its total response will be attributable to the conductivity of the bore hole liquid.

If the logging system is maintained centered in the bore hole by any conventional centering means such as that shown in Patent No. 2,427,950, for example, and if the diameter of the bore hole is substantially constant as a function of depth, the contribution made by the conductivity of the bore hole liquid to the total response of the system will be substantially constant and it can be either disregarded or compensated for, as desired. In practice, however, the bore hole diameter is not always constant but enlargements are sometimes found at different depths, particularly at the levels of friable formations. As a result, the portion of the total response attributable to the conducting bore hole liquid may vary as a function of depth and may, therefore, introduce errors into the logs that are obtained.

According to the invention, the undesirable effects of the bore hole liquid and of enlargements of the bore hole section are minimized by reducing the lateral sensitivity of the system in a region about the axis of the bore hole, from which such unwanted effects may be anticipated.

This is accomplished by providing multicoil systems comprising a principal two-coil system having a lateral sensitivity characteristic of the type represented by the curve 22 in Fig. 1, and at least one auxiliary two-coil system having its peak sensitivity at a lateral distance less than the lateral distance at which the peak sensitivity of the principal two-coil system occurs. In what follows, the two-coil combination of a logging system which produces the maximum response in a homogeneous medium will be taken as the principal two-coil system.

Referring again to Fig. 3, it will be apparent that the desired reduction in sensitivity may be effected by combining with the coil system of Fig. 1 a second coil system having a sensitivity characteristic like that represented by the curve 23 in Fig. 3. The second or auxiliary coil system may be designed to have peak sensitivity at about the outer limit of the zone of reduced response, so that the over-all system will have zero sensitivity at that point and appreciably reduced sensitivity at lateral distances up to that point. The resultant sensitivity of the system, which is the algebraic sum of the curves 22 and 23 is given by the curve 21.

A typical multiple coil system according to the invention is shown in Fig. 2. The principal two-coil system comprises the transmitter coil 15 and the receiver coil 17, while the second coil system comprises a auxiliary transmitter coil 20 and the common receiver coil 17. In order to provide for a sensitivity characteristic of the type represented by the curve 21 in Fig. 3, the transmitter coils 15 and 20 should be connected in series opposition, as shown, so that the responses induced in the receiver coil 17 will be combined in opposition.

As stated, the coil system comprising the transmitter coil 20 and the receiver coil 17 may be designed for peak sensitivity at the outer limit of the zone of reduced response. The spacing between the coils 20 and 17, then, may be determined from the lateral distance to the outer limit selected for the zone of reduced response, remembering that the peak of the sensitivity curve for a two-coil system occurs at substantially 0.9 the half separation distance between the coils.

It can be shown that the ordinates of the sensitivity curve for a two-coil system are proportional to the quantity $$\frac{S_t S_r}{(D_{t,r})^2}$$

where $D_{t,r}$ is the half separation distance between the transmitter and receiver coils and $S_t$ and $S_r$ are the total areas (the average effective area bounded by one turn multiplied by the number of turns) of the transmitter and receiver coils, respectively. For zero sensitivity of the over-all system at the lateral distance to the outer limit of the zone of reduced sensitivity, it will be apparent from Fig. 3 that the amplitude of the sensitivity for the coil system comprising the coils 20 and 17 should preferably be equal to the sensitivity of the coil system comprising the coils 15 and 17 at that lateral distance. The total areas of the coils 15 and 17 being known, therefore, it is a relatively simple matter to determine what the total area of the coil 20 should be to give the two-coil system comprising the coils 20 and 17 a sensitivity characteristic like the curve 23 of Fig. 1.

Field experience indicates that if the zone of reduced sensitivity extends to a lateral distance approximately twice the bore hole radius, this will usually take care of most bore hole enlargements as well as any slight invasion of the surrounding formations by the bore hole liquid that may have taken place. Accordingly, the outer limit of the zone of reduced sensitivity may desirably be taken as twice the radius of the bore hole.

Obviously, the spacing between the principal coils 15 and 17 should be made large enough to insure that the peak of the sensitivity curve 22 will occur beyond the outer limit of the zone of reduced sensitivity, i. e., 0.9D should be greater than twice the bore hole radius. If the value selected for D, the half separation distance between the coils 15 and 17, is such that .4D equals twice the bore hole radius, for example, the desired over-all sensitivity characteristic represented by the curve 21 of Fig. 3 might be obtained by disposing the transmitter coil 20 midway between the coils 15 and 17, connecting it in series opposition with the transmitter coil 15 and making its total area about 16.4% of the area of the coil 15. For these values, the sensitivity of the system is zero at .4D and is considerably reduced in the zone between the axis of the well logging system and .4D, although the curve 21 has a small negative loop in this zone, as appears in Fig. 3.

If desired, a multicoil system like that shown in Fig. 2 may be designed for substantially zero sensitivity over a zone extending from the axis of the system to any selected lateral distance therefrom. This may be accomplished by making the half-separation distance for the closest pair of transmitter and receiver coils at least two and one-half times the lateral distance over which a null response is desired, and by designing the system so as to satisfy the following relation:

$$\sum_{t,r} \frac{(\pm S_t)(\pm S_r)}{(D_{t,r})^3} = 0 \qquad (1)$$

In the summation, $t$ and $r$ range over all possible pairs of transmitter and receiver coils, $D_{t,r}$ is one-half of the separation distance between any pair of coils being considered, $S_t$ is the total area of a transmitter coil (the mean area bounded by one turn multiplied by the number of turns) and $S_r$ is the total area of a receiver coil. Thus, the numerator is the product of the total areas of a pair of coils and the denominator is the cube of one-half their separation distance.

The signs in the numerator indicate the polarity of the windings of each coil. A particular coil in, say, the transmitter system is taken to be positive. Then all other transmitter coils which are connected in series aiding with that coil are also considered positive, while those transmitter coils which are connected in series opposition with that coil are taken to be negative. A similar convention is established for the coils in the receiver system.

When all coils in the transmitter system are connected in series, the instantaneous current in each transmitter coil is the same; similarly, when the receiver coils are series connected, the total E. M. F. is the algebraic sum of the separate E. M. F.'s induced in the respective receiver coils.

When the coils are solenoids of equal radii disposed along a common axis, relation (1) may be simplified to $$\sum_{t,r} \frac{(\pm N_t)(\pm N_r)}{(D_{t,r})^3} = 0 \qquad (2)$$

where $N_t$ and $N_r$ are the numbers of turns in the transmitter and receiver coils, respectively, comprising a pair being considered.

If the coil 20 in Fig. 2 has one-eighth of the number of turns of the coil 15 and is connected in series opposition with the coil 15, substitution in the left hand side of relation (2) gives $$\frac{+N_{15}N_{17}}{D^3} + \frac{-\tfrac{1}{8}N_{15}N_{17}}{(\tfrac{1}{2}D)^3} \qquad (3)$$

where $N_{15}$ is the number of turns in the coil 15, $N_{17}$ is the number of turns in the coil 17 and D is one-half the separation distance between the coils 15 and 17. It will be apparent that the value of this expression is zero so that Equation 2 is satisfied. Then, if the separation distance between the coils 20 and 17 is made about five times the lateral distance over which a null response is sought, the desired sensitivity characteristic will be obtained, and is represented by the curve 21a in Fig. 3.

It is important to note that, whereas the coils 15 and 20 in Fig. 2 are connected as a transmitter group and the coil 17 as a single receiver coil, the same sensitivity curve for lateral investigation would be obtained if the same transmitter current were passed through the coil 17 and the coils 15 and 20 were taken as the receiver group. Such interchangeability holds throughout for the coil systems herein discussed.

Coil systems designed so that relation (1) above is satisfied have the further advantage of reduced mutual inductance between the transmitter group of coils and the receiver group of coils. In fact, the mutual inductance becomes negligible when the coil system is suspended in free space, for example. This feature is important since mutual inductance between the coil groups introduces a reactive signal into the measuring circuit, which may be undesirable if indications of resistive signals are sought.

While the coil 20 is shown midway between the coils 15 and 17 in Fig. 2 in the foregoing example it may be placed either above or below the common receiver coil 17, provided only that the distance between it and the coil 17 is less than the distance between the coils 15 and 17.

In some cases, the reduction in sensitivity obtained with a coil system of the type shown in Fig. 2, designed to have a sensitivity characteristic as represented by the curve 21 in Fig. 3, may not be sufficient. In such cases, a further reduction in sensitivity may be achieved according to the invention by adding to the multicoil system of Fig. 2, a third two-coil system, as shown in Fig. 4. In Fig. 4, the third two-coil system comprises a third transmitter coil 62 and the common receiver coil 17.

Figure 5:
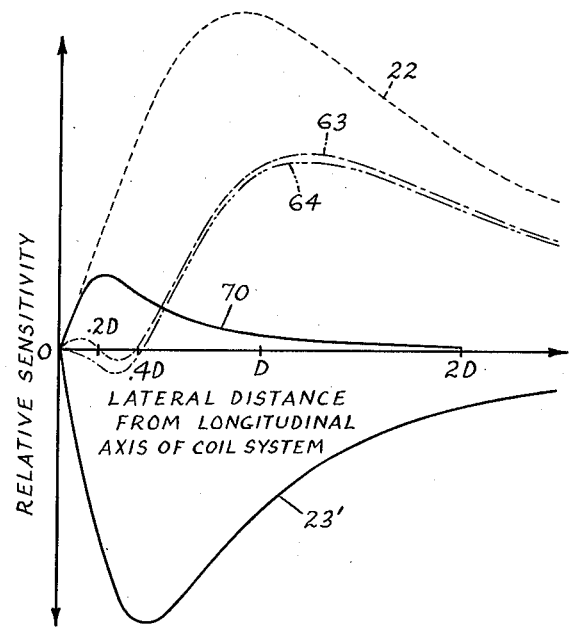
Fig. 5 is a graph illustrating typical lateral sensitivity curves for the system of Fig. 4.

The third two-coil system should be designed to have a sensitivity characteristic the ordinates of which, when added to the ordinates of the curve 21, will tend to reduce the ordinates of the latter curve between the origin and 0.4D. It is desirable, therefore, that the sensitivity peak of the third two-coil system should occur at about the lateral distance to the negative peak of the curve 21, and its amplitude should be approximately the same as the amplitude of the curve 21 at a second abscissae value between the origin and .4D. A typical sensitivity curve 70 having suitable characteristics is shown in Fig. 5. Since the sensitivity peak for any two-coil system occurs at about 0.9 the half separation distance between the coils, a suitable location for the coil 62 with respect to the coils 15, 17 and 20 can be readily selected. Further, since the ordinates of the sensitivity curve 22 are proportional to the quantity $$\frac{S_t S_r}{(D_{t,r})^3}$$

where $S_t$, $S_r$ and $D_{t,r}$ are as defined above, a suitable relative total area for the coil 62 can be readily determined.

In practice, it is found that the addition of a coil 62 suitably designed to give zero sensitivity at, say, .2D alters the system so that the sensitivity at .4D is no longer zero. However, by slight adjustments of the areas of the coils 20 and 62, the sensitivity of the system can be brought to zero at any two selected abscissae values such as, say, .2D and .4D. This might be achieved, for example, by placing the coil 20 midway between the coils 15 and 17, placing the coil 62 midway between the coils 20 and 17, connecting the coils 20 and 62 in series opposing and in series aiding, respectively, with the coil 15, and making the total areas of the coils 20 and 62 20.5% and 1.33%, respectively, of the total area of the principal coil 15. For these values, a sensitivity curve of the type shown at 63 in Fig. 5 may be obtained. As indicated, the ordinates of the curve 63 are zero at .2D and .4D and the curve has positive and negative loops of small amplitude between the origin and .4D.

Where substantially zero mutual inductance is desired in a system of the type shown in Fig. 4, this may be obtained by designing the system so that relation (1) above is satisfied. Thus, for the coil system of Fig. 4 with the spacings and connections indicated, relation (1) will be satisfied if the relative total areas of the coils 20 and 62 are 18.9% and 0.8%, respectively, of the total area of the principal coil 15. A typical sensitivity curve 64 for a system designed in this manner is shown in Fig. 5.

Figure 4A:
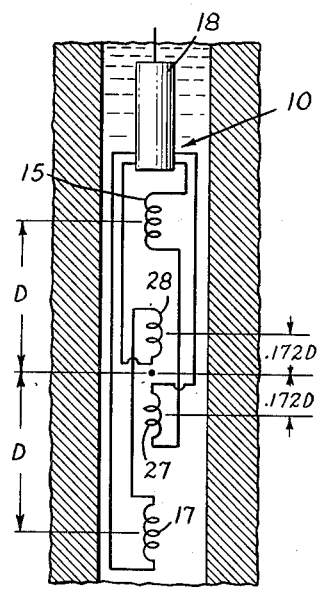
Fig. 4A is a schematic diagram of a symmetrical four-coil system constructed according to the invention.

While multicoil systems of the type shown in Figs. 2 and 4 are effective, in practice, the logs produced by them are not symmetrical, i. e. the portions of the log obtained in the vicinity of the upper and lower boundaries of a homogeneous formation, sandwiched between two other identical homogeneous formations, are not symmetrical about a median line through the formation. Where symmetrical logs are desired, multicoil systems of the type shown in Fig. 4A may be employed. In Fig. 4A, the multicoil system comprises essentially four two-coil systems, e. g., the coils 15 and 17, the coils 15 and 28, the coils 17 and 27 and the coils 28 and 27. Preferably, the principal transmitter coil 15 and the principal receiver coil 17 are connected, respectively, in series opposition with two auxiliary coils 27 and 28 (Fig. 4A).

Preferably, the turn ratios between the auxiliary coils 27 and 28 and the corresponding principal coils 15 and 17, respectively, should be the same, although the number of turns in a principal or auxiliary coil need not be the same as in the other principal or auxiliary coil. Further, both the principal coils and the auxiliary coils should preferably be symmetrically disposed about the midpoint of the coil system. Under these conditions, the sensitivity of the two-coil system comprising the coils 15 and 28 will be the same as the sensitivity of the two-coil system including the coils 17 and 27 and the sensitivity curve for the over-all system will be the composite of the several sensitivity curves for the combined four two-coil systems. By proper selection of the spacings between the coils and of their total areas in the manner outlined above in connection with Figs. 2 and 4, a sensitivity curve of desired shape may be obtained.

Since the auxiliary coils act in opposition to the principal coils, the mutual inductance of the system is also reduced. As stated, this is desirable since it decreases the inductive component of the E. M. F. in the receiver groups of coils. The mutual inductance is also reduced when the auxiliary coils are placed outside of the principal coils, rather than between them. Such a disposition will increase the over-all length of the coil system slightly, but it has certain advantages for some particular problems such as the logging of thin strata, for example.

As in the case of the coil systems discussed above, the coil system of Fig. 4A may be designed for substantially zero mutual inductance by choosing the spacings and total areas for the several coils so that relation (1) will be satisfied.

It has been observed that, in a multicoil system of the type shown in Fig. 4A, there is found to be a lower limit to the separation distance between the auxiliary coils for which good minimization of response may be obtained over a given lateral distance, while maintaining substantially zero mutual inductance between the transmitter and receiver groups. This lower limit is reached when the separation of the auxiliary coils becomes about 0.172 of the separation distance between the principal coils. By way of example, the coils 27 and 28 in Fig. 4A are shown separated a distance approximately 0.172 of the spacing between coils 15 and 17, and are located equal distances on opposite sides of the midpoint of the coil system.

The separation distances of the auxiliary coils from the midpoint of the coil system may range from the lower limit to about 0.25D for convenience in construction. In this range, the number of turns required for the auxiliary coils to satisfy relation (1) remains substantially small. If the separation distance between the auxiliary coils is increased to about 0.25 times the separation distance between the principal coils, the number of turns on the auxiliary coils can be as little as 3% of the number of turns of the principal coils and still satisfy relation (1).

Figure 5A:
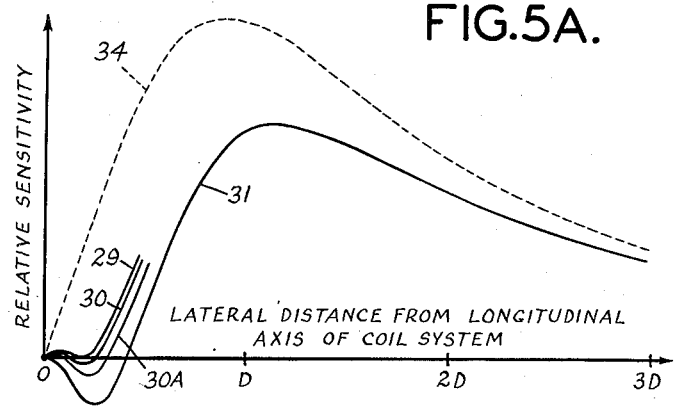
Fig. 5A is a graph illustrating typical lateral sensitivity curves for the system shown in Fig. 4A.

The lateral sensitivity of a coil system of the type illustrated in Fig. 4A and designed so as to satisfy relation (1) is essentially as represented by the curve 31 in Fig. 5A. For the curve 31, the principal coils 15 and 17 had the same number of turns, while the number of turns on each of the auxiliary coils 27 and 28 was about 6.4% of the number of turns on the principal coils. It will be observed from the curve 31 that the sensitivity of the system is negligible from the origin to about 0.06D and is zero at about .42D, while the curve has a negative loop of relatively small amplitude between 0.06D and .42D.

It has been found that the size of the negative loop 31 can be reduced by reducing slightly the number of turns on the auxiliary coils 27 and 28. For example, if the numbers of turns on the coils 27 and 28 are taken to be 5%, 4.5% and 4.26% of the number of turns on the principal coils, the sensitivity curves 30A, 30 and 29, respectively, are obtained. As shown best in Fig. 5B, which is an enlargement of the portion of the graph of Fig. 5A near the origin, reducing the number of turns on the auxiliary coils below 6.4%, the value for which relation (1) is satisfied, causes the sensitivity curve to go more and more positive initially, before forming the negative loop.

Further, as the amplitude of the positive loop increases, the amplitude of the negative loop decreases until, for the curve 30, the amplitudes are small and approximately equal. It will be apparent that a system in which the number of turns on the auxiliary coils is from four to five percent of the number of turns on the principal coils will have very low sensitivity between the origin and a given lateral distance therefrom. In such cases, the mutual inductance will not be zero. However, it will be small and can usually be tolerated.

The auxiliary coils may be placed either inside or outside the interval between the two principal coils. However, since it is desirable to keep the over-all length of the coil system to a minimum, the auxiliary coils are preferably placed between the principal coils.

It has been found that there are two possible choices for the number of turns on the auxiliary coils which will satisfy relation (1), where the separation of the auxiliary coils is greater than 0.172 times the separation distance between the principal coils. In order to reduce the sensitivity of the coil system to the signal received through the action of the auxiliary coils, the smaller number of turns is preferred.

As an example, for the case where the separation distance of the inner auxiliary coils is 0.2 times that of the principal coils, the number of turns on the auxiliary coils may either be about 3.8% or 21.2% of the number of turns on the principal coils for relation (1) to be satisfied. The larger number of turns, however, appreciably affects the shape of the sensitivity curve 60 (Fig. 6) for lateral investigation. The sensitivity curve 61 (Fig. 6) for the smaller number of turns is usually preferred.

In a typical example of a four-coil symmetrical system of the type shown in Fig. 4A, with negligible mutual inductance between transmitter and receiver groups, the coils 15, 17, 27 and 28 may be short, single-layer solenoids wound on a Bakelite mandrel about four inches in diameter. The centers of the short solenoids 15 and 17 may be thirty inches apart and the coils may contain forty turns each. The coils 27 and 28 may be about 5.4 inches apart and of two turns each, centered on the midpoint between the coils 15 and 17 with the coil 28 closest to the coil 15. The coils 15 and 27 are connected in series opposing, while coils 17 and 28 are also connected in series opposing.

It should be observed that the external field of sensitivity of a coil system such as the four-coil system of Fig. 4A, for example, is symmetrical. Such symmetry of response is desirable, in general, in well logging operations where it is desired to obtain more accurate indications of the positions of the boundaries of formations.

Figure 7:
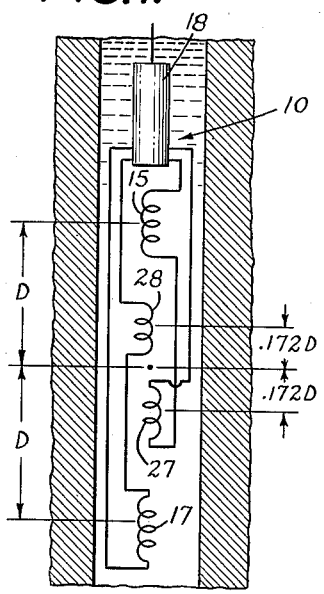
Fig. 7 is a schematic diagram of a four-coil system constructed according to the invention and having an asymmetrical field of sensitivity.
Figure 8:
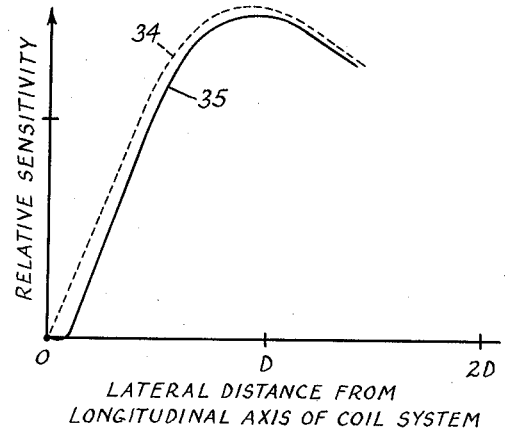
Fig. 8 is a graph on which is plotted a typical lateral sensitivity curve for the four-coil system of Fig. 7.
Figure 6:
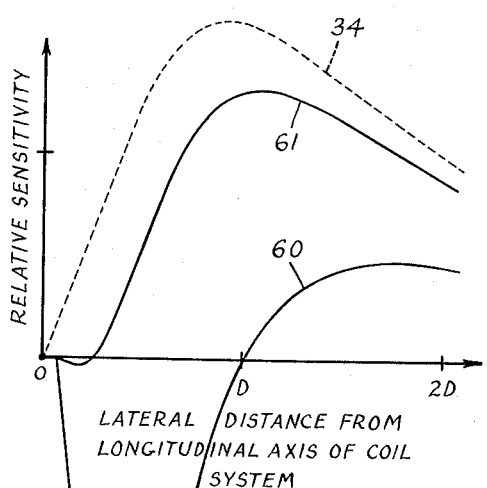
Fig. 6 is a graph showing typical lateral sensitivity curves for a four-coil system of the type illustrated in Fig. 4A for two different turn ratios between the auxiliary coils and the main coils, for the same spacings.

If the connections to one of the auxiliary coils of Fig. 4A are made series aiding with respect to its corresponding principal coil, as shown in Fig. 7, then there is no lower limit for the spacing between the auxiliary coils, where relation (1) is still to be satisfied. If the number of turns on the auxiliary coils of this coil system are taken to be about 7% of the turns of the principal coils, a sensitivity curve 35 as shown in Fig. 8 will result.

Figure 9:
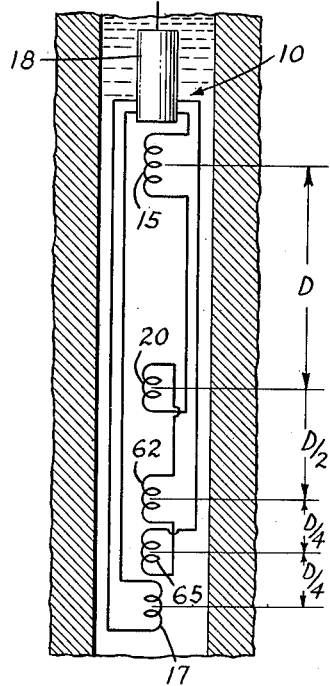
Fig. 9 is a schematic diagram of an asymmetrical five-coil system.
Figure 10:
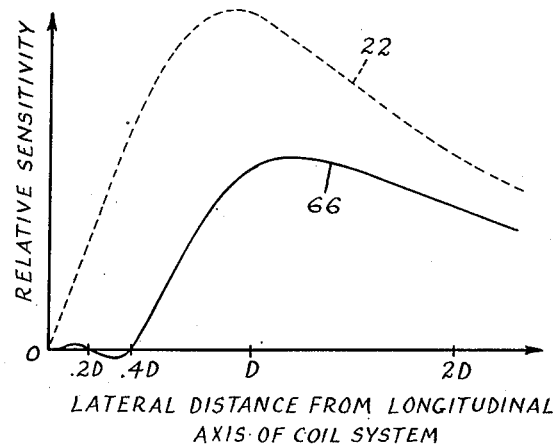
Fig. 10 is a graph illustrating a typical lateral sensitivity characteristic for the system of Fig. 9.
Figure 9A:
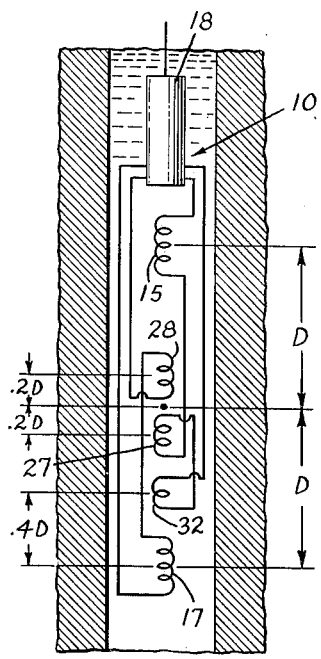
Fig. 9A illustrates diagrammatically another modification having five coils.
Figure 5B:
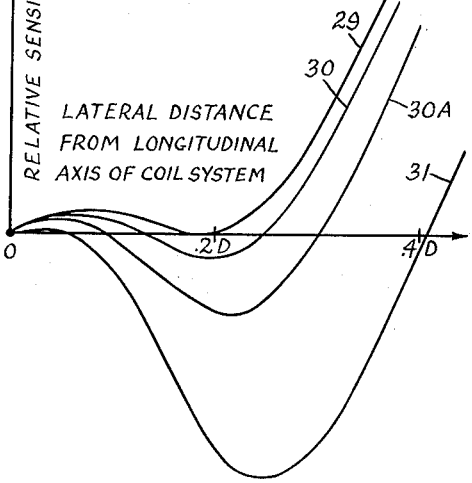
Fig. 5B is an enlarged portion of the graph of Fig. 5A near the origin of the coordinate system.

The small variations of sensitivity in the region of lowered sensitivity near the axis of the system which appear in the curves of Figs. 5A and 5B, can be further reduced by the addition of a fifth coil 32, as shown in Fig. 9A. This fifth coil, which, for example, is taken as a transmitter coil here, may be placed just inside or outside of the coil system and separated from the nearest principal coil by a distance about equal to the total separation distance of the pair of auxiliary coils. Preferably, it should be placed intermediate the two principal coils and connected in series with the other transmitter coils.

The fifth coil 32 (Fig. 9A) should preferably be designed so that its magnetic coupling with the principal receiver coil 17 acts to cancel the coupling between the auxiliary coils 27 and 28, relation (1) also being substantially satisfied. To accomplish this result, the fifth coil should preferably have a smaller number of turns than the auxiliary transmitter coil to which it is connected and its polarity should be the same as the polarity of that auxiliary coil. The number of turns, $N_5$, of the fifth coil are then practically related to the number of turns $N_p$, of the principal coil and the number of turns, $N_a$, of the auxiliary coil by the expression $$N_5 N_p = N^2_a \qquad (4)$$

when all coils have the same diameter. Since the principal coil has the greatest number of turns, relation (4) requires that the fifth coil have the smallest number of turns.

Frequently, relation (4) requires only a fraction of a turn for the fifth coil. In such instances, relation (4) may be effectively satisfied by using the more general relation $$S_5 S_p = S^2_a \qquad (5)$$

where $S_5$, $S_p$ and $S_a$ represent the total area of each coil, respectively. Thus, the diameter of a single loop of the fifth coil may be altered such that relation (5) is satisfied.

Figure 10A:
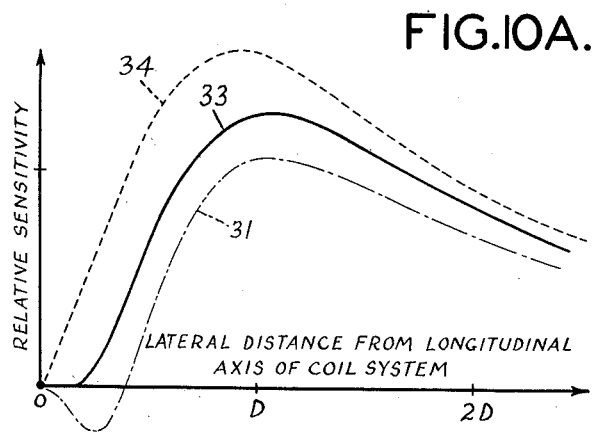
Fig. 10A is a graph showing a representative lateral sensitivity curve for the system of Fig. 9A.

The fifth transmitter coil 32, in effect, decreases the variations and lowers the sensitivity over the lateral zone in which the pair of auxiliary coils effectively act. This is shown on the sensitivity curve 33 (Fig. 10A) for a five-coil system of this type, where the sensitivity near the system axis is less than for a four-coil system like that shown in Fig. 4, the sensitivity of the latter being represented by the curve 31. It accomplishes this by introducing into the system a sensitivity characteristic of opposite polarity to that of the paired auxiliary coils, through its cooperative action with the principal receiver coil 17.

In the typical example shown in Fig. 9A, the auxiliary coils 27 and 28 are separated by a total distance 0.4D. The principal coils 15 and 17 are separated by a distance 2D. The coil 32 is placed at a distance 0.4D from the coil 17, intermediate the principal coils 15 and 17. The sensitivity curve 33 of Fig. 10A corresponds to a five coil system of the type shown in Fig. 9A where all the coils have the same area per turn; the coils 15 and 17 have 100 turns each; the coils 27 and 28 have about 3.2 turns each; and the fifth coil 32 has about 0.10 turn. The curve 34 for a two-coil system comprising the principal coils 15 and 17 of Fig. 9A alone, is also shown for comparison, together with the curve 31 from Fig. 5A for the four-coil system of Fig. 4A.

Figure 11:
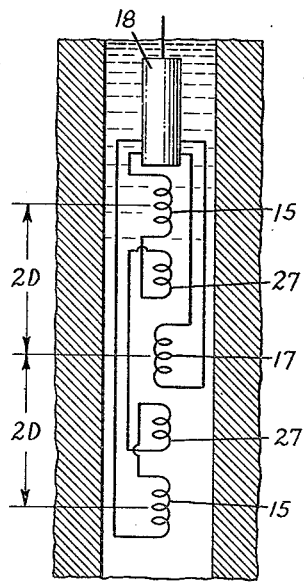
Fig. 11 is a diagrammatic showing of another five-coil system constructed according to the invention.

It is possible to devise five-coil systems having a single principal coil located at the midpoint of the system, as shown in Fig. 11. Such a system might comprise a single receiver coil 17, a pair of symmetrically disposed transmitter coils 15 and a pair of auxiliary coils 27 also placed symmetrically with respect to the coil 17.

The distances from the coil 17 to the auxiliary coils 27 may be one-third of the distance between the coil 17 and either principal coil 15 in this particular arrangement. The polarities of the outside principal coils 15 are the same while the auxiliary coils 27 are of opposite polarity. All four coils 15 and 27 are connected in series. The ratio of the auxiliary coils to the areas of the corresponding principal coils is one to twenty-seven. With these data, relation (1) is satisfied.

Figure 12:
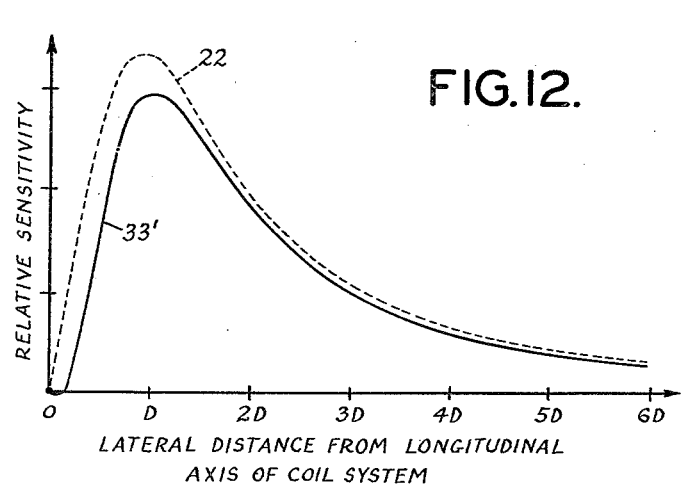
Fig. 12 shows a typical lateral sensitivity curve for the apparatus of Fig. 11.

The sensitivity curve 33' for the five-coil system of Fig. 11, with one principal coil located at the midpoint of the system, is represented schematically in Fig. 12. The corresponding sensitivity curve 22 for a two-coil system having the same separation distance between a receiver and transmitter coil and the same effective number of turns as in the principal coils of this five-coil system is also shown in Fig. 12.

It is evident that the symmetrical five-coil system of Fig. 11 gives a negligible response from material within a lateral distance of about ¼D, where D is the half separation distance between the center principal coil and the outside principal coils.

In a representative coil system of the type shown in Fig. 11, the separation distance between the center coil 17 and each outside principal coil 15 might be 27 inches, with a distance of 9 inches between the center coil 17 and each of the inner auxiliary coils 27. The outside principal coils have 27 turns, whereas the auxiliary coils have 1 turn each. The center coil has 20 turns. The principal coil 17 at the center, though, may have any particular number of turns considered favorable for the circuit to the electronic apparatus. The number of turns for a solenoid form are usually less than 100, because of practical space limitations.

A five-coil system having useful properties may be produced by adding another transmitter coil to the four-coil system shown in Fig. 4, the system being designed to have zero sensitivity not only at .4D, but also at a point between the origin and .4D, say .2D, along with zero mutual inductance. This may be accomplished by connecting the fifth coil 65 in series opposition with the principal transmitter coil 15, placing the coil 65 midway between the coils 62 and 17, as shown in Fig. 9, and assigning to the coils 20, 62 and 65 total areas that are 21.2%, 1.67% and .073%, respectively, of the total area of the coil 15. For these values, a sensitivity characteristic of the type shown by the curve 66 in Fig. 10 will be obtained. As shown, the curve 66 cuts the abscissae axis at about .2D and .4D and has positive and negative loops of small amplitude between the origin and .4D. If the coil spacings are selected so that .2D equals the nominal bore hole radius, the system will have reduced sensitivity between the bore hole radius and a lateral distance twice that radius.

*Coil systems characterized by reduced lateral sensitivity to relatively far away materials, including narrowing of lateral zone of investigation*

The width of the formation zone to which the major portion of the response is attributable may be narrowed, according to the invention, by designing the system for reduced sensitivity to materials located at lateral distances beyond said zone. Further narrowing of the zone of interest may be effected by also reducing the sensitivity of the system to materials lying in a zone immediately surrounding the induction logging apparatus.

It has been shown above that reduced sensitivity to materials near the bore hole axis may be achieved by combining the responses of a principal two-coil system and at least one auxiliary two-coil system in series opposition, the systems being so designed that the peak sensitivity of the latter occurs at a lesser lateral distance than the peak sensitivity of the former. Reduced lateral sensitivity to materials located relatively far away from the bore hole axis may be gained, according to the invention, by similar multicoil systems designed, however, so that the peak sensitivity of an auxiliary two-coil system occurs at a greater lateral distance than the peak sensitivity of the principal coil system.

A typical induction logging system designed for reduced sensitivity both in a zone immediately surrounding the apparatus and at lateral distances beyond a desired zone of investigation is shown in Fig. 13. It comprises, for example, a principal two-coil system including the transmitter coil 15 and the receiver coil 17, and two auxiliary two-coil systems comprising the transmitter coil 25 and the receiver coil 17, and the transmitter coil 24 and the receiver coil 17, respectively.

The portion of the system comprising the coils 15, 24 and 17 is designed as outlined above in connection with Fig. 2, and it provides reduced sensitivity over a zone extending from the origin to a given lateral distance therefrom. If designed for zero mutual inductance, the sensitivity of this portion of the circuit will be substantially as given by the curve 21a in Fig. 14.

The two-coil system comprising the transmitter coil 25 and the receiver coil 17 is designed for maximum sensitivity at a lateral distance beyond the peak of the sensitivity curve 22 of the principal two-coil system. Thus, in the typical embodiment shown in Fig. 13, the coil 25 is placed a distance about 4D from the receiver coil 17, preferably on the same side of the coil 17 as the coil 15 so as to decrease the over-all length of the system, and its total area is made sufficient to produce the desired reduction in sensitivity beyond the peak of the curve 22.

The sensitivity of the two-coil system comprising the coils 25 and 17 is given by the curve 68 which lies below the abscissae axis since the transmitter coils 15 and 25 are connected in series opposition. The curve for the over-all system is shown at 26 in Fig. 14, and it is the algebraic sum of the separate sensitivity curves for the three two-coil systems comprising the combination in Fig. 13.

If zero mutual inductance is desired, the coil system of Fig. 13 should be designed to satisfy relation (1). Also, in designing for reduced sensitivity at relatively great distances from the bore hole, i. e., distances greater than say 2D, for example, it is desirable that either of the following relations also be satisfied:

$$\sum_{t}(\pm S_t)=0 \qquad (6)$$

or $$\sum_{r}(\pm S_r)=0 \qquad (7)$$

where $S_t$ and $S_r$ are the total areas of the transmitter and receiver coils, respectively, and the signs indicate the polarities of the windings, as before. Equations 6 and 7 can apply independently or simultaneously when there are a plurality of transmitter and receiver coils, respectively.

In coil systems where each coil has the same area for a single turn, condition (6) may be expressed as $$\sum_i (\pm N_i) = 0 \qquad (8)$$

For a coil system as shown in Fig. 13 having coaxial coils with the same area for a single turn, and with the coil spacings indicated, it can be shown that relations (1) and (8) will be satisfied if the coil 24 has minus one-ninth as many turns as the coil 15 and the coil 25 has minus eight-ninths as many turns as the coil 15. The negative signs indicate that the auxiliary coils are to be connected in series opposition with coil 15.

Actually, the curve 26 in Fig. 14 corresponds to a four-coil system of the type shown in Fig. 13 designed as specified in the preceding paragraph. The resultant sensitivity for the portion of the coil system comprising the coils 15, 24 and 17, in the region adjacent the axis of the coil system, is found to be practically unaltered by the addition of the auxiliary coil 25 for the spacing used. For that reason, the curves 21A and 26 are practically identical for a lateral extent of about 0.2D.

It will be observed that the curve 26 has an appreciable reduction in sensitivity for lateral distances beyond its maximum, as compared with the corresponding decrease in sensitivity for the curve 21A, which represents the sensitivity of the system of Fig. 13 with the coil 25 omitted. A typical sensitivity curve 22 for a conventional two-coil system consisting of the coils 15 and 17 with a total separation distance 2D is also shown in Fig. 14 by way of comparison. Thus, the sensitivity at half maximum for the curve 26 extends over a lateral distance of about one-half D to 2D as compared with about one-half D to almost 3D for the curve 21A. In a uniform conductive medium, therefore, the system shown in Fig. 13 will give a more localized response than either the system of Fig. 13 with the coil 25 omitted, or a conventional two-coil system.

If reduced sensitivity in a zone near the apparatus is not needed, as might be the case in a dry hole or a hole containing oil, for example, the coil 24 may be omitted, in which case the coil 25 will insure low sensitivity at relatively great distances from the apparatus.

In a typical example of a four-coil system of the type shown in Fig. 13, the coils 15, 17, 24 and 25 may be short, single-layer solenoids wound on a Bakelite mandrel of about four inches in diameter. The centers of the short solenoids 15 and 17 may be thirty inches apart and the coils may have forty-five turns each. The coil 17, though, can have more or less turns than the coil 15. The coil 24 may have five turns and should be located half way between the coils 15 and 17. The coil 25 may have forty turns and it is spaced from the coil 15 a distance equal to the distance between the coils 15 and 17. The coils 24 and 25 are connected in series opposing with the coil 15.

Longitudinal focussing coil systems

Improved sensitivity to relatively thin beds, e. g., beds of the order of a few times the diameter of the bore hole, can be achieved, according to the invention, by compounding multiple coil systems, such that the region of sensitivity is focussed to the beds lying in a region comprised between two horizontal planes that are symmetrically disposed with respect to the center of the coil system and are separated by a definite distance. The longitudinal sensitivity of a coil system is defined herein as the resistive component of the response of the system to a transversely extending (usually horizontal) layer of material of unit thickness and unit conductivity as a function of the longitudinal (vertical) distance between said layer and the midpoint of the system.

Figure 16:
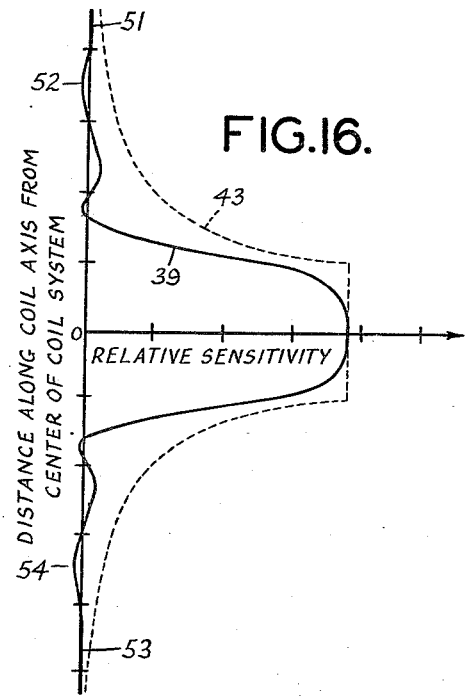
Fig. 16 is a graph on which is plotted a longitudinal sensitivity curve for the apparatus of Fig. 15.

A typical longitudinal sensitivity curve 43 for a conventional two-coil induction logging system is shown in Fig. 16. It will be noted that the curve 43 does not drop sharply from its maximum to a minimum value, but drops gradually over a relatively long vertical distance. A system of this type, therefore, is not well suited for logging relatively thin formations, where it is desirable that the sensitivity characteristic decrease from its maximum to a low and negligible amplitude over a short vertical distance.

Figure 15:
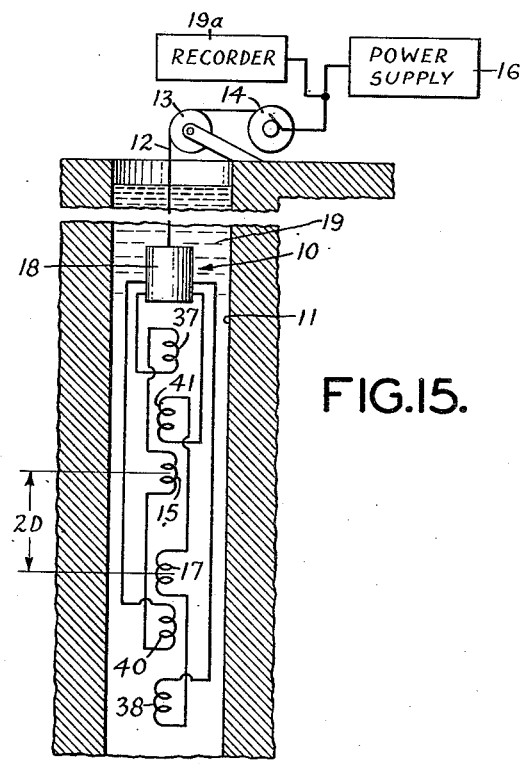
Fig. 15 illustrates schematically a longitudinal focussing coil system constructed according to the invention.

The desired characteristics may be achieved by using symmetrical configurations of auxiliary two-coil systems whereby the curve of over-all longitudinal sensitivity is made to cut the ordinate (vertical) axis at two points above and at two points below the focussing coils. This is accomplished, as shown in Fig. 15, by placing above the principal transmitter coil 15 an auxiliary focussing transmitter coil 37 of opposite winding polarity and having a smaller total area (the product of the mean area bounded by one turn and the number of turns) than the coil 15, and by placing beneath the receiver coil 17 a focussing receiver coil 38 with opposite polarity of winding to the coil 17 and with a total area equal to that of the coil 37. The coils 15 and 17 have equal areas in this particular system. It is important to note, however, that the number of turns in all coils of a group can be simultaneously changed by the same proportional amount without changing the investigation characteristics of the coil system. Preferably, the total separation distance between the principal coils 15 and 17 is chosen to be not more than about two-thirds the thickness of the thinnest stratum which is to be logged and for which a close value for the true conductivity is to be obtained.

It has been found convenient to start with a ratio of three to two for the areas of the principal coil and the focussing coil of the same category (transmitter or receiver), respectively, each focussing coil being connected in series opposing with its principal coil. Further, the spacing between each focussing coil and its principal coil may suitably be made the same as the separation distance 2D between the principal coils. For this spacing, the longitudinal sensitivity curve cuts the axis of zero sensitivity at a point in the vicinity of the focussing coils displaced toward the principal coils and again at a point about twice this distance from the midpoint of the coil system, while the amplitude of the sensitivity curve at points above and below the focussing coils is kept at a very low value as compared with the maximum sensitivity.

The coils 38 and 37 are adjusted by a cut and try process so that the small areas of the penultimate loops which are negative (negative in the sense that conductive material in the region transverse to its longitudinal extent gives a response of opposite sign to that of the main area) are slightly larger than that of the ultimate positive loops formed by the sensitivity curve as the curve approaches its axis of zero sensitivity at large distances. Under these conditions, the average response of the system to the beds above and below the system is reduced to a relatively low value. However, it is found that the mutual inductance between the transmitter and receiver groups of coils is not zero.

In order to bring the mutual inductance substantially to zero, and/or to reduce the lateral sensitivity of the system to materials relatively near its axis, an auxiliary compensating transmitter coil 40 is added between the receiver coils 17 and 38, while an auxiliary compensating receiver coil 41 of the same total area as the coil 40 is placed between the transmitter coils 15 and 37. The compensating coils 40 and 41 are placed symmetrically with respect to the center of the coil system and the polarities of their windings are the same as the auxiliary coils 37 and 38. Preferably, the compensating coils 40 and 41 should be placed at a distance of about 0.8D from their respective principal coils, 2D being the total separation distance between the principal coils. As a practical matter, the coils 40 and 41 need have very few turns to annul the remaining mutual inductance between the groups of coils, if it is desired to do so. The presence of the compensating coils will now slightly alter the positions and areas of the negative loops of the prior four-coil system such that the areas of the outer pairs of loops are brought into closer equality, simultaneously decreasing the effective area of these loops to a minimum.

Further adjustment in the focussing and compensating coils can be continued until an optimum response obtains, where relation (1) is still a condition to be substantially satisfied. The adjustment for optimum response occurs when the areas of the loops 51, 52, 53 and 54 of the sensitivity curve about its axis of zero sensitivity are small and substantially equal.

A guiding principle in the construction of coil systems for focussing or localization of the sensitivity along the longitudinal axis is to make the final two pairs of loops above and below the coil system of small substantially equal areas. Where this is done, the responses from material in the transverse regions covered, for example, by the loops 51 and 52 of Fig. 16 substantially annul the responses from material in the transverse regions covered by the loops 53 and 54. With that arrangement, the response from material within the transverse region covered by the maximum sensitivity of the coil system is the effective contributor to the integrated response.

In Fig. 16 is shown a longitudinal sensitivity curve 39 for a focussed six-coil symmetrical system of the type shown in Fig. 15, in contrast to the sentivity curve 43 for a conventional two-coil system. As indicated above, the longitudinal sensitivity is the relative sensitivity plotted along the ordinates axis, for the resistive component of the E. M. F. produced in the group of receiver coils by a stratum of unit thickness and unit conductivity placed at different positions along the vertical axis from the midpoint of the coil system. The curve 39 is characterized by a sharp drop in signal for strata above and below the principal coils of the system. As a result, relatively thin strata are logged with greater detail and their true conductivity can be directly determined with better accuracy than is possible with a conventional two-coil system.

In practice, of course, the amplitudes of the responses are directly proportional to the current flowing in the transmitter coils, and changes in the amplitude of response may be accomplished by changing the transmitter coil current as well as by amplification of the E. M. F. induced in the receiver group.

The purpose of longitudinal focussing is to provide induction logging systems in which the total response to a formation is substantially proportional to the electrical conductivity of that formation, for all formation thicknesses down to the thinnest stratum to be measured. A measuring circuit which has been calibrated to measure conductivities in terms of integrated response will then indicate directly the conductivities of the desired permeable strata traversed by a well.

Figure 17:
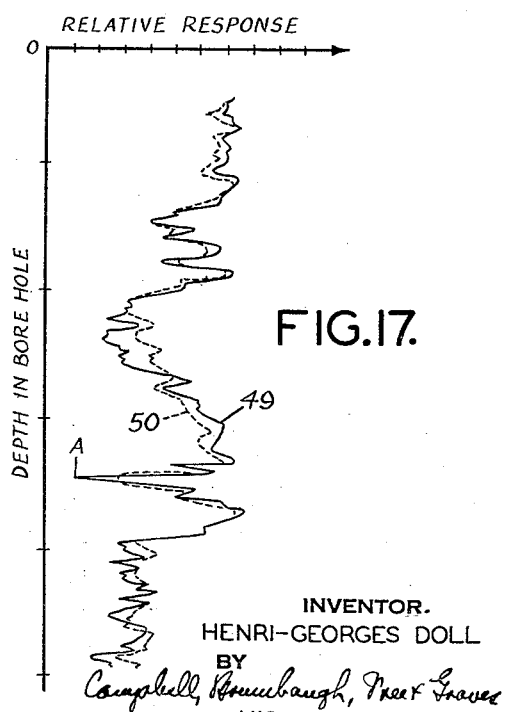
Fig. 17 is a graph illustrating a representative log such as might be made with the apparatus of Fig. 15, together with a log made by a conventional two-coil system for purposes of comparison.

A comparison of a representative induction log 49 recorded with a six-coil system of the type illustrated in Fig. 15 is shown in Fig. 17, in contrast with a log 50 produced by a conventional two-coil system. It is evident that the curve 49 has sharper boundaries and shows more detail than the curve 50. The separation between the principal coils 15 and 17 was twelve inches for the six-coil system and ten inches for the two-coil system. On the logs, an increasing response means increasing conductivity. Thus, the minimum at point A is a streak of low conductivity, or, in other terms, a resistive streak. It will be seen that the focussed six-coil system of Fig. 15 gives a better indication of the conductivity of the thin stratum at A, than could be obtained with a conventional two-coil system. As stated, the latter receives an appreciable signal from the upper and lower conductive formations.

A representative six-coil focussing system of the type shown in Fig. 15, with substantially zero mutual inductance between the transmitter and receiver coil system groups, and using short solenoids wound on a mandrel, might comprise, for example, outer coils 37 and 38 with nineteen turns each and disposed eighty-one inches apart. The inner coils 15 and 17 may have thirty turns each, separated twenty-seven inches apart and centered on the midpoint between the coils 37 and 38. The coils 40 and 41 may have one turn each, situated about 10.8 inches, respectively, beyond the coils 15 and 17 from the center of the system. The coils 37, 15 and 40 are connected in series, the coils 37 and 40 being in opposition to the coil 15. The coils 38, 17 and 41 are likewise connected in series, the coils 38 and 41 being in opposition to the coil 17.

Since many bore holes in the field contain a relatively conductive liquid which may invade a zone in the formations immediately surrounding the apparatus, it may be desirable to design the system of Fig. 15 so as to have reduced sensitivity in that zone. This may be accomplished by suitably compounding the several two-coil systems as indicated above to achieve that result.

Figure 18:
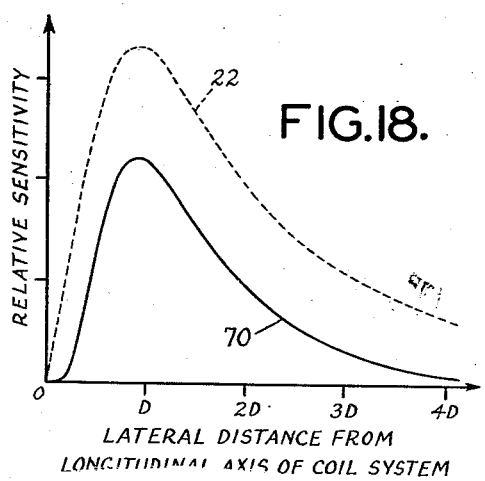
Fig. 18 shows in graphical form a lateral sensitivity curve for the coil system shown in Fig. 15.

A representative lateral sensitivity curve 70 for a six-coil system of the type shown in Fig. 15 designed to satisfy relation (1) is shown in Fig. 18. The similarity between the curve 70 in Fig. 18 and the curves shown in Figs. 3, 5 and 14 will be readily apparent.

It will be noted that all of the coils in the six-coil system described above are disposed symmetrically about the midpoint of the system such that if the system were rotated about its midpoint and through a straight angle, coils of one category would replace coils of another category with the same relative polarities. However, other symmetrical coil configurations may be employed within the spirit of the invention. For example, it is possible to design systems having a coil located at the midpoint, about which other coils are symmetrically disposed, which coils may include pairs of coils of the same or different categories. For a symmetrical sensitivity field pattern, such systems would need to have an odd number of coils, and at least seven coils would be required if relation (1) is also to be satisfied.

Figure 19:
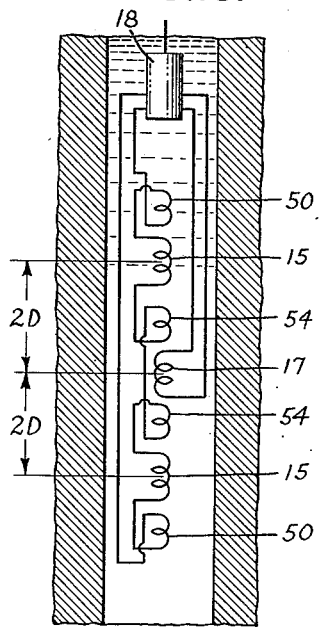
Fig. 19 is a seven-coil longitudinal focussing system constructed according to the invention.
Figure 20:
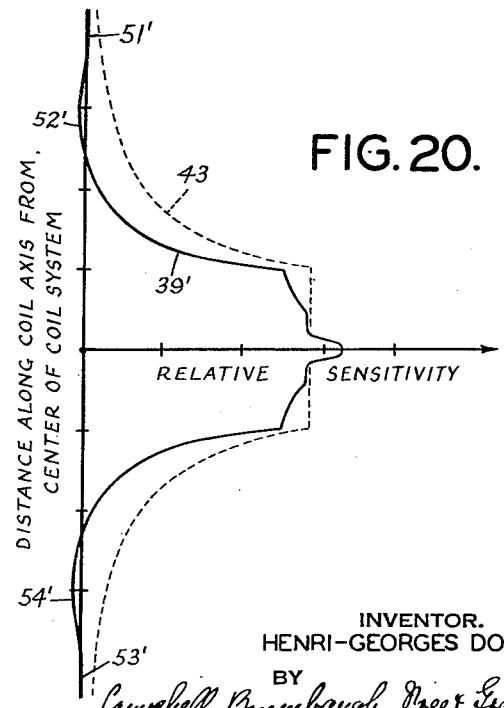
Fig. 20 gives an illustrative longitudinal sensitivity curve for the system shown in Fig. 19.

A typical seven-coil focussing system is shown in Fig. 19 and it comprises a single receiver coil 17 located at the midpoint of the system, and symmetrically disposed pairs of principal transmitter coils 15, focussing coils 50, and compensating coils 54. The coils 54 serve to insure that relation (1) will be substantially satisfied. Both coils in each of the three categories are of the same area. By way of example, the distances between the receiver coil 17 and the several other coils of the system may be as follows:

Transmitter coils 15 _____ 2D
Compensating coils 54 _____ ½D
Focussing coils 50 _____ 6D Preferably, the spacing between the transmitter coils 15 should be not more than approximately two-thirds of the thickness of the thinnest stratum whose conductivity is to be measured. The transmitter, compensating, and focussing coils are all connected in series, the latter two groups of coils being connected in series opposition with the transmitter coils. For the spacings suggested above, the areas of the focussing coils and compensating coils, expressed as percentages of the area of a principal coil of the same category, are 72% for the focussing coils 50, and 1.5% for the compensating coils 54. A typical longitudinal sensitivity curve 39' for the system of Fig. 19 is shown in Fig. 20.

If the over-all length of the seven-coil system of Fig. 19 is taken to be the same as that of the six-coil system of Fig. 15, the lateral extent of the zone of substantial nullification is appreciably greater for the latter. For that reason, a six-coil system is generally preferred.

It is also possible to devise longitudinal focussing systems having less than six coils. In such systems, however, it is not possible to design for good vertical focussing and at the same time to satisfy relation (1). Where appreciably reduced lateral sensitivity to materials relatively near the logging system is not required, as where the bore hole contains a drilling mud of low conductivity and is kept closely to gauge, and where some mutual inductance can be tolerated, it is possible to eliminate the compensating coils from the six-coil system shown in Fig. 15. If the spacings between the remaining coils are not changed, the focussing coils 37 and 38 being connected in series opposition with their respective principal coils 15 and 17, and having about 1/72 of the total area thereof, the resultant four-coil system will have good longitudinal focussing properties.

The coils may be wound as short single-layer solenoids on a nonmagnetic and nonconductive form of convenient diameter to result in appreciable cross-sectional area but small enough to pass freely inside of standard bore holes. Multi-layer coils can be used when the number of turns is large but care must then be exercised to minimize distributed capacitance effects. The resistance of the coils should be kept low. With wire covered with good insulation to withstand bore hole temperatures and pressures, the number of turns is somewhat limited if the coils are to be considered as approximately short solenoids.

It has been found that a few tens of turns are usually sufficient even for the principal coil, since high amplification of the received signal can be accomplished by use of appropriate circuits in the electronic cartridge 18.

In cases where a coil of a given radius would require a fraction of a turn, the radius of the coil may be reduced or the shape altered to obtain the desired coil area. The design requirements then become based on the more general conditions expressed in terms of total areas of the coils used.

One controlling factor in the design of coil systems is the distance beyond the wall of the bore hole which it is desired to reach by induction logging. This distance, though, is also dependent upon the frequency of the alternating current used in the transmitter coils. The system design of this invention is applicable to those conductivities and frequencies for which the characteristic length of the skin effect is appreciably greater than the radius to which it is desired to investigate.

In all of the induction logging systems described above, all transmitter coils are connected in series so that the same current passes through them. Similarly, all receiver coils are connected so that the total response is the algebraic sum of the responses of the several receiver coils. While series connections are preferred, it will be understood that they are not necessary. On the contrary, each transmitter coil or a subgroup of transmitter coils, for example, may be energized by current of different intensity from that flowing in other transmitter coils in a group. Where this is done, relations (1) and (2) hold as before, but, the number of ampere turns in an energized coil must be used in place of the number of turns alone. Also, the couplings between coils in the transmitter group and coils in the receiver group or groups may be varied by known amounts as desired.

In the foregoing description of the several embodiments having reduced laterally sensitivity to relatively nearby materials, it has been assumed that the coil assembly is maintained coaxial with the bore hole by any conventional centering device such as that disclosed in prior Patent No. 2,427,950 to H. G. Doll. It will be apparent, however, that the system will operate effectively even if it is not centered in the bore hole. Of course, where no centering means is employed, the coil system should preferably be designed so that the radius of the zone of reduced sensitivity is large enough to insure the desired nullification characteristics when the coil system is as far off center as it can get, i. e., when it is in engagement with the wall of the bore hole.

Where reference is made in the claims to two or more transmitter-receiver coil systems, it will be understood that this language denotes either a combination of two or more coil systems each comprising separate transmitter and receiver coils as in Fig. 4A, for example, or a combination of two or more coil systems having a common transmitter or receiver coil as in Fig. 2, for example.

It will be further understood that the principle of reciprocity applies, so that transmitter coil groups and receiver coil groups in the several typical induction logging systems disclosed herein can be interchanged without modifying the results obtained. Other modifications can be made within the spirit of the invention as will be apparent to those skilled in the art. Therefore, the several representative embodiments that have been described above by way of illustration are not to be regarded as limiting the scope of the following claims.

I claim:

1. In apparatus for investigating earth formations traversed by a bore hole, the combination of at least two alternating current energized transmitter-receiver coil systems mounted in fixed relation to each other for movement through a bore hole and having different sensitivity characteristics corresponding to different zones of investigation, electrical circuit means for combining the response of one of said coil systems with the response of another so as to produce a resultant response representative mainly of material lying in a predetermined zone, and means for obtaining indications of said resultant response.

2. In apparatus for investigating earth formations traversed by a bore hole, the combination of a plurality of alternating current energized transmitter-receiver coil systems mounted in fixed relation to each other for movement through the bore hole and having different sensitivity characteristics corresponding to different zones of investigation, electrical circuit means for subtracting the response of at least one of said coil systems from the response of at least one other so as to produce a resultant response representative mainly of material lying in a predetermined zone, and means for obtaining indications of said resultant response.

3. In apparatus for investigating earth formations traversed by a bore hole, the combination of at least two alternating current energized transmitter-receiver coil systems mounted in fixed relation to each other for movement through a bore hole and having lateral sensitivity peaks located at different lateral depths from the longitudinal axes thereof, electrical circuit means for opposing the responses of said two-coil systems so as to produce a resultant response which is substantially unaffected by material in a zone relatively close to said coil systems, and means for obtaining indications of said resultant response.

4. In apparatus for investigating earth formations traversed by a bore hole, the combination of a plurality of alternating current energized transmitter-receiver coil systems mounted in fixed relation to each other for movement through a bore hole and having lateral sensitivity peaks located at different lateral depths from the longitudinal axes thereof, respectively, electrical circuit means for opposing the response of at least one of said coil systems to the response of at least one other of said coil systems so as to produce a resultant response that is substantially unaffected by material in a zone relatively close to said coil systems, and means for obtaining indications of said resultant response.

5. In apparatus for investigating earth formations traversed by a bore hole, the combination of receiver coil means adapted to be disposed in the bore hole, means for simultaneously generating a plurality of alternating current magnetomotive forces at different, longitudinally spaced locations on one side of said receiver coil means, such that the algebraic sum of said magnetomotive forces is substantially zero, and means for obtaining indications of alternating current voltages induced in said receiver coil.

6. In apparatus for investigating earth formations traversed by a bore hole, the combination of a plurality of alternating current energized transmitter-receiver coil systems mounted in fixed relation to each other for movement through a bore hole and having lateral sensitivity peaks located at different lateral distances from the longitudinal axes thereof, said coil systems being designed so that the algebraic sum of the magnetomotive forces generated thereby is substantially zero, electrical circuit means for combining the responses of said coil systems so as to produce a resultant response that is substantially unaffected by material lying in a zone relatively near said coil systems and is only slightly affected by material lying beyond a predetermined lateral distance from said coil systems, and means for obtaining indications of said resultant response.

7. In apparatus for investigating earth formations traversed by a bore hole, the combination of an alternating current energized transmitter-receiver coil system adapted to be disposed in a bore hole, means for generating an alternating current magnetomotive force in the vicinity of said coil system on the transmitter coil side thereof and of such polarity as to reduce the sensitivity of said coil system in a longitudinal direction therefrom, and means for obtaining indications of the response of said coil system.

8. In apparatus for investigating earth formations traversed by a bore hole, the combination of an alternating current energized transmitter-receiver coil system adapted to be disposed in a bore hole, receiver coil means disposed near one longitudinal extremity of said system on the receiver coil side thereof in which an alternating voltage is adapted to be induced by said transmitter-receiver coil system, means for combining said induced voltage with the response of said coil system so as to produce a resultant response that is not appreciably affected by material near and in a longitudinal direction from said coil system, and means for obtaining indications of said resultant response.

9. In apparatus for investigating earth formations traversed by a bore hole, the combination of an alternating current energized transmitter-receiver coil system, means mounted on the transmitter coil side of said system and movable therewith for generating an alternating current magnetomotive force in the vicinity of one end of said coil system and of such polarity as to reduce the longitudinal sensitivity of the coil system to material near said one end, receiver coil means mounted on the receiver coil side of said system and adapted to have induced therein an alternating voltage electrical circuit means for combining said induced voltage with the response of said coil system so as to produce a resultant response that it not appreciably affected by material near the opposite ends of said coil system, and means for obtaining indications of said resultant response.

10. In induction well logging apparatus, the combination of at least three coils adapted to be lowered into a bore hole in fixed, longitudinally spaced apart relation with respect to one another, a first circuit connecting two coils of said three in opposite relation to one another, a second circuit including said third coil, a source of alternating current connected to one of said circuits, and electrical indicating means connected to the other of said circuits, said two coils being asymmetrically disposed with respect to said third coil.

11. In induction well logging apparatus, the combination of at least three coaxial coils adapted to be lowered into a bore hole in fixed, longitudinally spaced apart relation with respect to one another, a first circuit connecting two coils of said three in opposite relation to one another, a second circuit including said third coil, a source of alternating current connected to one of said circuits, and electrical indicating means connected to the other of said circuits, said two coils being asymmetrically disposed with respect to said third coil.

12. In induction well logging apparatus, the combination of at least three coils adapted to be lowered into a bore hole in fixed, longitudinally spaced apart relation with respect to one another, two of said coils being energized by alternating current, and electrical indicating means connected to the third of said coils, said two energized coils being asymmetrically disposed with respect to said third coil.

13. In induction well logging apparatus, the combination of at least three coils adapted to be lowered into a bore hole in fixed, longitudinally spaced apart relation with respect to one another, a first circuit connecting two coils of said three in series, a second circuit including said third coil, a source of alternating current connected to one of said circuits, and electrical indicating means connected to the other of said circuits, said two coils being asymmetrically disposed with respect to said third coil and the spacings and total areas of said coils being selected so as substantially to satisfy the relation $$\sum_{1,2} \frac{(\pm S_1)(\pm S_2)}{(D_{1,2})^3} = 0$$

where the summation is taken over all possible pairs of coils, each pair comprising a coil in said first circuit and a coil in said second circuit, $D_{1,2}$ is one-half the separation distance between a pair of coils being considered, $S_1$ is the total area of the first circuit coil of said pair, and $S_2$ is the total area of the second circuit coil of said pair, plus or minus signs being assigned to the areas $S_1$ and $S_2$ depending upon the relative polarities of the corresponding coils.

14. In induction well logging apparatus, the combination of at least three coils adapted to be lowered into a bore hole in fixed, longitudinally spaced apart relation with respect to one another, at least two of said coils being energized by alternating current, electrical indicating means connected to the third of said coils, said two coils being asymmetrically disposed with respect to said third coil and said coils being selected so as substantially to satisfy the relation $$\sum_{1,2} \frac{(\pm N_1 I_1)(\pm N_2)}{(D_{1,2})^3} = 0$$

where the summation is taken over all possible pairs of coils, each pair comprising an energized coil and an unenergized coil, $D_{1,2}$ is one-half the separation distance between a pair of coils being considered, $N_1 I_1$ is the number of ampere turns in the energized coil of the pair, and $N_2$ is the number of turns in the unenergized coil of the pair, plus or minus signs being assigned to $N_1 I_1$ and $N_2$ depending upon the relative polarities of the corresponding coils.

15. In induction well logging apparatus having reduced sensitivity in a zone extending a given lateral distance from the apparatus, the combination of at least three coils adapted to be lowered into a bore hole in fixed, longitudinally spaced apart relation with respect to one another, a first circuit connecting two coils of said three in series opposition, a second circuit including said third coil, a source of alternating current connected to one of said circuits, and electrical indicating means connected to the other of said circuits, said two coils being asymmetrically disposed with respect to said third coil and the spacings and total areas of said coils being selected so as substantially to satisfy the relation $$\sum_{1,2} \frac{(\pm S_1)(\pm S_2)}{(D_{1,2})^3} = 0$$

where the summation is taken over all possible pairs of coils, each pair comprising a coil in said first circuit and a coil in said second circuit, $D_{1,2}$ is one-half the separation distance between a pair of coils being considered, $S_1$ and $S_2$ are the total areas of the first circuit and second circuit coils, respectively, of said pair, plus or minus signs being assigned to the areas $S_1$ and $S_2$ depending upon the polarities of the corresponding coils.

16. In induction well logging apparatus, the combination of three coils adapted to be lowered into a bore hole in fixed, longitudinally spaced apart relation with respect to one another, a first circuit connecting two coils of said three in series opposition, a second circuit including said third coil, said two coils being asymmetrically disposed with respect to said third coil, a source of alternating current connected to one of said circuits, and electrical indicating means connected to the other of said circuits, the spacings and total areas of said coils being selected so as substantially to satisfy the relation $$\frac{S_1}{(D_{1,3})^3} - \frac{S_2}{(D_{2,3})^3} = 0$$

where $S_1$ and $S_2$ are the total areas of said first circuit coils respectively, and $D_{1,3}$ and $D_{2,3}$ are the half separation distances between said second circuit coil and the first circuit coils of areas $S_1$ and $S_2$, respectively.

17. In induction well logging apparatus, the combination of at least four coils adapted to be lowered into a bore hole in fixed, longitudinally spaced apart relation with respect to one another, a first circuit connecting at least two of said coils in opposed relation to one another, a second circuit connecting two other of said coils in opposed relation to one another, a source of electrical energy connected to one of said circuits, and electrical indicating means connected to the other of said circuits, said first circuit coils being asymmetrically disposed with respect to said second circuit coils, and the mutual inductance between said first circuit and second circuit coils being substantially zero.

18. In induction well logging apparatus, the combination of at least four coils adapted to be lowered into a bore hole in fixed, longitudinally spaced apart relation with respect to one another, a first circuit connecting at least one of said coils in opposed relation to at least another one or more, a second circuit connecting at least one other of said coils in opposed relation to at least another one or more, a source of electrical energy connected to one of said circuits, and electrical indicating means connected to the other of said circuits, said first circuit coils being asymmetrically disposed with respect to said second circuit coils, and the mutual inductance between said first circuit and second circuit coils being substantially zero.

19. In induction well logging aparatus, the combination of at least four coils adapted to be lowered into a bore hole in fixed, longitudinally spaced apart relation with respect to one another, a first circuit connecting at least two of said coils in series aiding relation to one another, a second circuit connecting two other of said coils in opposed relation to one another, a source of electrical energy connected to one of said circuits, and electrical indicating means connected to the other of said circuits, said first circuit coils being asymmetrically disposed with respect to said second circuit coils, and the mutual inductance between said first circuit and second circuit coils being substantially zero.

20. In induction well logging apparatus, the combination of two pairs of coils adapted to be lowered into a bore hole in fixed, longitudinally spaced apart relation, one pair being located equal distances on opposite sides of a reference point and a second pair being located equal greater distances on opposite sides of said reference point, a first circuit connecting two alternate of said coils in series opposition, a second circuit connecting the other two of said coils in series opposition, a source of electrical energy connected to one of said circuits, and electrical indicating means connected to the other of said circuits.

21. In induction well logging apparatus, the combination of a pair of coaxially disposed main coils of equal radii and turns adapted to be lowered into a bore hole, said coils being longitudinally spaced apart equal distances on opposite sides of a reference point, a pair of auxiliary coils of equal radii and turns movable coaxially with said main coils and longitudinally spaced apart equal different distances on opposite sides of said reference point, a first circuit connecting one of said main coils in series opposition with the auxiliary coil furthest away therefrom, a second circuit connecting the other of said main coils in series opposition with the other of said auxiliary coils, a fifth coil disposed near one of said main coils and connected in series opposition with the other of said main coils, a source of electrical energy connected to one of said circuits, and electrical indicating means connected to the other of said circuits.

22. In induction well logging apparatus, the combination of a pair of coaxially disposed main coils of equal radii and turns adapted to be lowered into a bore hole, said coils being longitudinally spaced apart equal distances on opposite sides of a reference point, a pair of auxiliary coils of equal radii and turns movable coaxially with said main coils and longitudinally spaced apart equal different distances on opposite sides of said reference point, a first circuit connecting one of said main coils in series opposition with the auxiliary coil furthest away therefrom, a second circuit connecting the other of said main coils in series opposition with the other of said auxiliary coils, a fifth coil disposed near one of said main coils and connected in series opposition with the other of said main coils, a source of electrical energy connected to one of said circuits, and electrical indicating means connected to the other of said circuits, the total area $S_5$ of said fifth coil being in accordance with the relation $$S_5 S_p = S_a^2$$

where $S_p$ and $S_a$ are the total areas of the principal and auxiliary coils respectively, and the separation distance between said fifth coil and the nearest principal coil being selected so that a major portion of the response attributable to said fifth coil and said nearest principal coil will be produced by material lying in a cylindrical zone about the axis of the bore hole from which substantially nil response is desired.

23. In induction logging apparatus, the combination of at least three coils adapted to be lowered into a bore hole in fixed, longitudinally spaced apart relation with respect to one another, a first circuit connecting two of said coils in series opposition, a second circuit including said third coil, a source of alternating current connected to one of said circuits, and electrical indicating means connected to the other of said circuits, said two coils having substantially the same total area and being asymmetrically disposed with respect to said third coil.

24. In induction logging apparatus, the combination of three coils adapted to be lowered into a bore hole in fixed, longitudinally spaced apart relation with respect to one another, a first circuit connecting two of said coils in series opposing, a second circuit including said third coil, a source of alternating current connected to said first circuit, and electrical indicating means connected to said second circuit, said two coils having substantially the same total area and being asymmetrically disposed with respect to said third coil, the spacing between one of said two coils and the third coil being greater than the spacing between the other of said two coils and the third coil.

25. In induction logging apparatus, the combination of at least four coils adapted to be lowered into a bore hole in fixed, longitudinally spaced apart relation with respect to one another, a first circuit connecting two of said coils in series opposition with a third coil, a second circuit including a fourth coil, a source of alternating current connected to one of said circuits, and electrical indicating means connected to the other of said circuits, said four coils forming a plurality of transmitter-receiver coil systems each comprising a coil in said first circuit and a coil in said second circuit, the coil separation distances for at least two of said transmitter-receiver coil systems being different so as to produce peak sensitivities for said two systems at different lateral distances from the apparatus, said coils being designed so as to satisfy the relation $$\sum_{1,2} \frac{(\pm S_1)(\pm S_2)}{D_{1,2}{}^3} = 0$$

where the summation is taken over all possible pairs of coils, each pair comprising a coil in said first circuit and a coil in said second circuit, $S_1$ and $S_2$ are the total areas, respectively, of the first circuit coil and second circuit coil comprising a pair, plus or minus signs being assigned to the total areas $S_1$ and $S_2$ depending upon the polarities of the corresponding coils, and $D_{1,2}$ is one-half the separation distance between said pair of coils, and the algebraic sum of the total areas of said first circuit coils being substantially zero.

26. In induction logging apparatus, the combination of at least four coils adapted to be lowered into a bore hole in fixed longitudinally spaced apart relation with respect to one another, two of said coils being located substantially equal distances on opposite sides of a third coil and the spacing between the fourth coil and one of said two coils being substantially twice the spacing between said two coils, a first circuit including said one coil, a second circuit connecting said fourth coil and said third coil in series opposition with the other of said two coils, a source of alternating current connected to one of said circuits, and electrical indicating means connected to the other of said circuits, three of said coils being asymmetrically disposed with respect to said one coil, said coils being designed so as to satisfy the relation $$\sum_{1,2} \frac{(\pm S_1)(\pm S_2)}{D_{1,2}{}^3} = 0$$

where the summation is taken over all possible pairs of coils, each pair comprising a coil in said first circuit and a coil in said second circuit, $S_1$ and $S_2$ are the total areas, respectively, of the first circuit coil and second circuit coil comprising a pair, plus or minus signs being assigned to the areas $S_1$ and $S_2$ depending upon the polarities of the corresponding coils, and $D_{1,2}$ is one-half the separation distance between said pair of coils, and the algebraic sum of the total areas of said second circuit coils being substantially zero.

27. In induction well logging apparatus, the combination of at least two coils adapted to be lowered into a bore hole in longitudinally spaced apart relationship, a source of electrical energy connected to one of said coils, electrical indicating means connected to the other of said coils and at least one auxiliary coil suitably energized and disposed with respect to said one coil to reduce the response of said apparatus to material lying outside of a zone bounded approximately by a transverse plane in the vicinity of said auxiliary coil, said auxiliary coil and said one coil being asymmetrically disposed with respect to said other coil.

28. In induction well logging apparatus, the combination of at least two coils adapted to be lowered into a bore hole in longitudinally spaced apart relationship, a source of electrical energy connected to one of said coils, electrical indicating means connected to the other of said coils, and at least one auxiliary coil connected in series opposition with said one coil and located relatively near said one coil at a position lying outside of said two coils, for reducing the response of said apparatus to material lying outside of a zone bounded approximately by a transverse plane in the vicinity of said auxiliary coil.

29. In induction well logging apparatus, the combination of at least two coils adapted to be lowered into a bore hole in longitudinally spaced apart relationship, a source of electrical energy connected to one of said coils, electrical indicating means connected to the other of said coils, and at least one auxiliary coil connected in series opposition with the other of said coils and located relatively near said other coil at a position lying outside of said two coils, for reducing the response of said apparatus to material lying outside of a zone bounded approximately by a transverse plane in the vicinity of said auxiliary coil.

30. In induction well logging apparatus, the combination of at least two coils adapted to be lowered into a bore hole in longitudinally spaced apart relationship, a source of electrical energy connected to one of said coils, electrical indicating means connected to the other of said coils, and a pair of auxiliary coils located near said two coils, respectively, but outside thereof, said auxiliary coils being connected, respectively, in series opposition with said two coils, whereby the response of said apparatus to material lying outside of a zone bounded approximately by substantially parallel transverse planes in the vicinity of said two auxiliary coils, respectively, is reduced.

31. In induction well logging apparatus, the combination of at least two coils adapted to be lowered into a bore hole in longitudinally spaced apart relationship, a source of electrical energy connected to one of said coils, electrical indicating means connected to the other of said coils, a pair of auxiliary coils located near said two coils, respectively, but outside thereof, said auxiliary coils being connected, respectively, in series opposition with said two coils, and energized coil means for reducing the mutual inductance between the two groups of series-connected coils substantially to zero, whereby the response of said apparatus to material lying outside of a zone bounded approximately by substantially parallel transverse planes in the vicinity of said two auxiliary coils, respectively, is reduced.

32. In induction well logging apparatus, the combination of at least two coils adapted to be lowered into a bore hole in longitudinally spaced apart relationship, a source of electrical energy connected to one of said coils, electrical indicating means connected to the other of said coils, a pair of auxiliary coils located near said two coils, respectively, but outside thereof, said auxiliary coils being connected, respectively, in series opposition with said two coils, second auxiliary coil means connected in series opposition with said one coil, and third auxiliary coil means connected in series opposition with said other coil, said second and third auxiliary coil means being designed to reduce substantially to zero the mutual inductance between the two groups of series-connected coils.

33. In induction well logging apparatus, the combination of at least three coils adapted to be lowered into a bore hole in longitudinally spaced apart relationship, a first circuit connecting two of said coils in series opposition, a second circuit including said third coil, a source of electrical energy in one of said circuits, electrical indicating means in the other of said circuits, said two coils being asymmetrically disposed with respect to said third coil, and a plurality of auxiliary coil means connected in said first and second circuits, respectively, and located near one of said two coils and near said third coil, respectively, outside of said three coils so as to reduce the response of the apparatus to material lying immediately thereabove and therebelow, the coil system being designed according to the relation:

$$\sum_{1,2} \frac{(\pm S_1)(\pm S_2)}{D_{1,2}{}^3} = 0$$

where the summation is taken over all possible pairs of coils, each pair including a field generating coil and a signal inducing coil, $\pm S_1$ and $\pm S_2$ are the total polarized areas of a field generating coil and a signal inducing coil, respectively, comprising a pair, and $D_{1,2}$ is one-half the separation distance between the two coils comprising said pair.

34. In induction well logging apparatus, the combination of a first coil adapted to be lowered into a bore hole, a first pair of coils located equal, fixed, longitudinal distances on opposite sides of said first coil, a second pair of coils located equal, greater, fixed longitudinal distances on opposite sides of said first coil, a first circuit including said first coil, a second circuit connecting said first pair of coils in series opposition with said second pair of coils, a source of electrical energy connected to one of said circuits, and electrical indicating means connected to the other of said circuits.

35. In induction well logging apparatus, the combination of a first coil adapted to be lowered into a bore hole, three pairs of coils located symmetrically about said first coil, the coils in said pairs being located different fixed longitudinal distaces from said first coil, a first circuit connecting two of said pairs of coils in series opposition with the third pair of coils, a second circuit including said first coil, a source of electrical energy connected to one of said circuits and electrical indicating means connected to the other of said circuits.

36. In apparatus for investigating earth formations traversed by an uncased bore hole, tthe combination of means for simultaneously inducing first and second electromagnetic fields within said formations and within the fluid in said bore hole, means for simultaneously detecting first and second electromotive forces arising from the reaction of the conductive material within said formations and within said bore hole to said electromagnetic fields, respectively, the distances between said detecting means and said two field inducing means being different, means for combining said first and second electromotive forces, and means for recording the resistive component of the resultant electromotive force of said combination.

37. In apparatus for investigating earth formations traversed by an uncased bore hole, the combination of means for inducing a first electromagnetic field within said formations and within said bore hole, means for inducing a second electromagnetic field of opposite polarity and unequal intensity to said first electromagnetic field within said formations and said bore hole, means for detecting an electromotive force arising from the reaction of conducting material within said formation and said bore hole to said first and second electromagnetic fields, and means for recording the resistive component of said detected electromotive force, the spacings between the detecting means and each of said field inducing means being different.

38. In apparatus for investigating earth formations traversed by an uncased bore hole, the combination of an array of longitudinally spaced apart transmitter coils adapted to be disposed in the bore hole, means for energizing said transmitter coils whereby electromagnetic fields are induced within the region in the vicinity of said transmitter coils, a plurality of longitudinally spaced apart receiver coils mounted in fixed relation to said transmitter coils, thereby causing electromotive forces to be induced in said receiver coils, common electrical circuit means connected to receive said induced electromotive forces, and means for recording the resultant electromotive force within said circuit, said transmitter and receiver coils forming a plurality of transmitter-receiver coil systems each comprising a transmitter coil and a receiver coil, the coil separation distances for at least two of said transmitter-receiver coil systems being different.

39. In apparatus for investigating earth formations traversed by an uncased bore hole, the combination of means for continuously inducing a first electromagnetic field in said formations, continuously inducing in said formations a plurality of electromagnetic fields substantially in opposition to said first electromagnetic field, and positioned in fixed spatial relationship to said first electromagnetic field, the strengths of said plurality of opposing electromagnetic fields varying in a predetermined ratio to said first electromagnetic field, and means for detecting an electromotive force arising from the reaction of said formations to said first and said plurality of opposing electromagnetic fields, the separation distances between said detecting means and at least two of said field inducing means being different.

40. In apparatus for investigating earth formations traversed by an uncased bore hole, the combination of means for establishing a plurality of electromagnetic fields within said formations and within said bore hole, means for establishing within said formations and said bore hole at least one other electromagnetic field of different intensity and in opposition to at least one of said plurality of electromagnetic fields, means for detecting an electromotive force arising from the reaction of conducting material within said formation and said bore hole to said plurality of electromagnetic fields, and means for exhibiting a function of the resistive component of said detected electromotive force, the separation distances between said detecting means and at least two of said field establishing means being different.

41. In apparatus for investigating earth formations traversed by an uncased bore hole, the combination of a plurality of transmitter coils longitudinally spaced apart along the bore hole, means for energizing said transmitter coils whereby electromagnetic fields are induced within the region in the vicinity of said transmitter coils, a receiver coil adapted to be disposed in the bore hole near said transmitter coils and movable therewith, thereby causing an electromotive force to be induced in said receiver coil, and means for exhibiting a function of said electromotive force, the separation distances between said receiver coil and at least two of said transmitter coils being different.

HENRI-GEORGES DOLL.

REFERENCES CITED

The following references are of record in the file of this patent:

UNITED STATES PATENTS

| Number | Name | Date |
|---|---|---|
| 2,220,070 | Aiken | Nov. 5, 1940 |
| 2,264,318 | Lee | Dec. 2, 1941 |
| 2,304,051 | Beers | Dec. 1, 1942 |